United States Patent [19]

Chin et al.

[11] Patent Number: 4,482,685
[45] Date of Patent: Nov. 13, 1984

[54] COPOLYMERIZATION OF ETHYLENE AND CHLOROTRIFLUOROETHYLENE IN AN AQUEOUS EMULSION

[75] Inventors: Hong B. Chin, Parsippany; Swayambu Chandrasekaran, Mountain Lakes, both of N.J.

[73] Assignee: Allied Corporation, Morris Township, Morris County, N.J.

[21] Appl. No.: 429,916

[22] Filed: Sep. 30, 1982

[51] Int. Cl.$^3$ .......................................... C08F 210/02
[52] U.S. Cl. .................... 526/91; 526/209; 526/210; 526/214; 526/220; 526/225; 526/249
[58] Field of Search ................ 526/249, 91, 209, 210, 526/214, 220, 225

[56] References Cited

U.S. PATENT DOCUMENTS

| | | | |
|---|---|---|---|
| 3,006,881 | 10/1961 | Bolstad et al. | 260/29.6 |
| 3,043,823 | 7/1962 | Mantell et al. | 260/92.1 |
| 3,720,655 | 3/1973 | Mueller | 260/87.5 B |
| 3,767,634 | 10/1973 | Scoggins | 260/87.5 A |
| 3,857,827 | 12/1974 | Dohany | 260/92.1 |
| 3,859,262 | 1/1975 | Hartwimmer | 260/80.77 |
| 4,025,709 | 5/1977 | Blalse | 526/225 |
| 4,225,482 | 9/1980 | Ferren et al. | 260/29.6 F |
| 4,329,268 | 5/1982 | Chakrabarti et al. | 524/166 |

FOREIGN PATENT DOCUMENTS 767757  8/1954  United Kingdom .

OTHER PUBLICATIONS

Product Information, Fluorad Fluorochemical Surfactants by 3M Corp., copyright 3M, 1979, Y-ISIB (129.2)BBM.
Information Letter of Jan. 1, 1981 by PCUK, Products Chimques Ugine Kumhmann, Centre d'Applications De Levallois, B.P. 108-92303 Levallois-Perret.
Arthur & Elizabeth Rose, The Condensed Chemical Dictionary, 1966, p. 720.

*Primary Examiner*—Harry Wong, Jr.
*Attorney, Agent, or Firm*—Richard A. Negin; J. P. Friedenson; R. A. Anderson

[57] ABSTRACT

A method of emulsion copolymerization of ethylene and chlorotrifluoroethylene in the presence of a water soluble initiator and a water soluble fluorosurfactant. The fluorosurfactant having the general formula: $CA_3(CF_2)_B(C_2H_4)_D$-X wherein A is selected from H and F, B is 1 to 10, D is 1 to 6, and X is a hydrophilic group.

23 Claims, No Drawings

COPOLYMERIZATION OF ETHYLENE AND CHLOROTRIFLUOROETHYLENE IN AN AQUEOUS EMULSION

BACKGROUND OF THE INVENTION

This invention relates to the preparation of copolymers of ethylene and chlorotrifluoroethylene; more particularly this invention relates to the copolymerization of ethylene and chlorotrifluoroethylene in an aqueous emulsion.

Copolymers of ethylene and chlorotrifluoroethylene have been polymerized using free radical initiation. The free radical initiators include a wide variety of peroxide and oxidation-reduction systems. The oxidation-reduction system is generally in an aqueous suspending medium.

The copolymerization is usually carried out in an aqueous suspension of chlorotrifluoroethylene with ethylene dissolved in it or in a bulk state of chlorotrifluoroethylene in contact with gaseous ethylene. The polymer composition can be adjusted by either the ethylene pressure or the reaction temperature. The physical or mechanical properties of the copolymers formed depend not only on the polymer composition but also on the degree of alternation of the monomers. The degree of alternation of the monomers is determined largely by the reaction temperature. The pH of the aqueous medium can affect the rate of polymerization. The pH of the aqueous medium can be controlled by a buffering agent and arranged between 7 and 12, and preferably, between 7 and 9. U.S. Pat. No. 3,767,634 discloses a process of copolymerizing chlorotrifluoroethylene and ethylene using an oxidizing agent and a reducing agent where there is a sufficient amount of a water-soluble buffer compound to maintain the pH above 7 and up to about 12. U.S. Ser. No. 330,120, filed Dec. 14, 1981, hereby incorporated by reference, discloses the use of copper salts in redox polymerization of ethylene chlorotrifluoroethylene.

The method of emulsion polymerization is well known and has been used for various polymers and elastomers. The emulsion polymerized polymers are generally characterized by high polymerization rates, high molecular weight polymers and a product which is an aqueous latex. It is known to emulsion polymerize a variety of fluoropolymers. U.S. Pat. Nos. 3,857,827 and 4,025,709 disclose the emulsion polymerization of polyvinylidine fluoride. U.S. Pat. No. 4,225,482 discloses the emulsion polymerization of the copolymer of tetrafluoroethylene and ethylene. U.S. Pat. Nos. 3,006,881 and 3,043,823 disclose the emulsion polymerization of polychlorotrifluoroethylene.

Aqueous dispersions of ethylene chlorotrifluoroethylene copolymers have been made by dispersing ground copolymer powder using dispersion agents. The present invention relates to the formation of the copolymer of ethylene and chlorotrifluoroethylene by emulsion polymerization resulting in an aqueous latex emulsion.

SUMMARY OF THE INVENTION

The present invention is a method of emulsion copolymerizing ethylene and chlorotrifluoroethylene in the presence of a water soluble initiator and a water soluble fluorosurfactant of the formula: $CA_3(CF_2)_B(C_2H_4)_D$-X wherein A is H or F, B is 1 to 10 and preferably 4 to 10, D is 1 to 6, and X is hydrophilic group. Preferably, X is selected from the group consisting of alkali metal sulfonates, alkali metal carboxylates, ammonium carboxylates, ammonium sulfonates, amine sulfonates, alkyl esters, alkyl alkoxylates, and polyoxyethylene ethanol.

In an embodiment of the process of the present invention, an aqueous solution of the fluorosurfactant is fed to the reactor. Chlorotrifluoroethylene, preferably as a liquid, is added to the solution. Gaseous ethylene is added to the reactor. A catalyst, preferably a free radical initiator, is fed to the reactor. The preferred catalyst is an oxidation-reduction system which more preferably includes from 0.1-10 parts/million of a cupric cation, preferably in the form of cupric sulfate. The mixture reacts by emulsion polymerization and forms an emulsion or latex of the copolymer of ethylene and chlorotrifluoroethylene.

DESCRIPTION OF THE PREFERRED EMBODIMENTS

The present invention is a method of emulsion copolymerizing ethylene and chlorotrifluoroethylene to form an emulsion or latex. The method comprises emulsion copolymerizing ethylene and chlorotrifluoroethylene in the presence of a water soluble initiator and a water soluble fluorosurfactant. In a preferred embodiment, an aqueous solution of a fluorosurfactant is fed to a reactor. Chlorotrifluoroethylene is added to the solution and gaseous ethylene is fed to the reaction. An initiator is fed to the reactor.

The type of surfactant has been found to be particularly important in the process of the present invention. The surfactant which has been found useful in successfully copolymerizing ethylene and chlorotrifluoroethylene is a fluorinated surfactant having the general formula: $CA_3(CF_2)_B(C_2H_4)_D$-X wherein A is H or F, B is 1 to 10 and preferably 4 to 10 D is 1 to 6, and X is a solubilizing hydrophilic group. X causes the fluorosurfactant of the present invention to be soluble in water.

The fluorosurfactant of the present invention can be considered to have two parts. One part is a substituted carbon chain. This part must contain pendant fluorine atoms and pendant hydrogen atoms. As shown in the Comparative Example if the carbon chain is fully fluorinated the fluorosurfactant will be unsatisfactory. The reaction was very slow and resulted in an emulsion of very low solid concentration. In addition to substituted fluorine and hydrogen atoms, the carbon chain can have other pendant groups such as chlorine atoms. If there is a greater amount of pendant hydrogen than specified by the fluorosurfactant formula the molecular weight of the copolymer is too low.

X can be a radical of material selected from the group consisting of alkali metal sulfonates, alkali carboxylates, ammonium sulfonates, ammonium carboxylates, amine sulfonates, alkyl ester, alkyl alkoxylates, and polyoxyethylene ethanol. Preferred fluorosurfactants are fluoroalkyl alcohols, sulfonic acids and salts and esters thereof. Sulfonic acid salts include sodium, potassium and ammonium salts.

Particularly preferred fluorosurfactants have the formula $CA_3(CF_2)_B(C_2H_4)_D$-$SO_3E$ where A is H or F, E is H+ or an anion such as K+, Na+ or NH$_4$+, B is 1 to 10, preferably 4 to 10, and D is 1 to 6. Other useful fluorinated surfactants include fluorinated alkyl alkoxylates, alkyl polyoxyethene ethanol and ethoxylated polyfluoro alcohol.

Useful fluorosurfactants include Forafac ® poly fluorinated organic surfactants 1033, 1110, and 1185 disclosed in the information letter of January, 1981 by PCUK, Produits Chimques Ugine Kulhmann, Centre D'Applications De Levallois, B.P. 108-92303 LeVallois-Perret hereby incorporated by reference. Also included are Fluorad ® fluorochemical surfactants 170C, 171, and 430. These Fluorad ® fluorochemical surfactants are manufactured by 3M Corp. and are discussed in the bulletin Product Information, Fluorad ® Fluorochemical Surfactants by 3M Corp. copyright 3M, 1979, Y-ISIB (129.2) BPM hereby incorporated by reference.

The vehicle for the emulsion copolymerization process of the present invention is water. The amount of water employed in the process is sufficient to maintain a uniform emulsion of the reactant monomers and catalyst system. It is preferred to use from 100 to about 750, more preferably 100 to 500, and most preferably 100 to 300 parts by weight of water per 100 parts by weight of chlorotrifluoroethylene monomer charged to reaction zone. The water is preferably deionized or distilled water. To be water soluble, at least 0.1 percent by weight of the fluorosurfactant must dissolve in water. There is from 0.1 to 5.0 and preferably 1.25 to 2.0 percent by weight of the water of the water soluble fluorosurfactant.

The initiator is preferably a free radical initiator which can include peroxy-type catalysts, such as hydrogen perioxide or hydroperoxides, and oxidation-reduction systems. Oxidation-reduction systems are preferred. A particularly preferred oxidation-reduction system is that described in U.S. Ser. No. 330,120, filed Dec. 14, 1981, hereby incorporated by reference.

An initiator useful in the process of the present invention is a redox catalyst system employed in an aqueous system. The redox system comprises an oxidizing agent and a reducing agent. The oxidizing agents can include inorganic peroxides of the type disclosed in U.S. Pat. No. 2,689,241, hereby incorporated by reference. These include water soluble inorganic peroxides such as perchlorates, perborates, persulfates, perphosphates, percarbonates, barium peroxide, zinc peroxide, and hydrogen peroxide. Particular examples include, sodium, potassium, calcium, barium and ammonium salts of persulfuric acid and perphosphoric acids. The preferred oxidizing agents include the following water soluble peroxide compounds: alkali metal and alkaline earth metal water soluble salts of persulfuric acid such as the salts of sodium, potassium, barium, and the ammonia salts of persulfuric acid. The preferred salts are ammonium persulfate (($NH_4$)$_2S_2O_8$) and potassium persulfate ($K_2S_2O_8$). Potassium persulfate is the most preferred oxidizing agent. Ammonium persulfate and potassium persulfate are preferred because of their high activity at low temperature, availability, and low cost.

The amount of oxidizing agent employed is generally about 0.05 to 10, preferably 0.1 to 5 and more preferably 0.1 to 1 parts by weight based on 100 parts of chlorotrifluoroethylene monomer.

The reducing agents include sodium formaldehyde sulfoxylate, and ammonium and alkali metal sulfur-containing salts such as the sulfites, thiosulfates, bisulfites, hydrosulfites of ammonia, sodium, potassium, rubidium, and cesium. Of these, the sodium and potassium salts are generally preferred because of good activity and lower cost. Most preferred is sodium bisulfite ($NaHSO_3$) and sodium metabisulfite ($Na_2S_2O_5$). The amount of reducing agent employed is generally about 0.05 to 10, preferably 0.1 to 5 and more preferably 0.1 to 1 parts by weight based on 100 parts of chlorotrifluoroethylene monomer.

In addition to the initiator, there is preferably from at least 0.1, preferably 0.1 to 10, and more preferably 1 to 10 parts per million by weight of a cupric cation, based on the weight of the aqueous medium, including water and additional solvents such as alcohol. Although more than 10 parts per million of cupric cation by weight of the aqueous medium can be used, it is preferred to use not more than 10 parts per million since the presence of copper in the copolymer formed by the process of the invention adversely affects its thermal stability, including the processing stability. Excess copper results in discoloration and bubble formation during processing of ethylene chlorotrifluoroethylene copolymer.

The cupric cation is supplied by a water soluble cupric salt. Preferably the cupric salt is inorganic. Preferred cupric salts include but are not limited to cupric chloride, cupric nitrate, cupric sulfate, cupric bromide, cupric dichromate, and cupric fluoride.

The pH of the reacting mixture in the process of the present invention is from 4 to about 12, preferably 7 to about 10, and more preferably from above 7 to 9. The buffer employed in the catalyst system may be any water soluble compound which in the presence of the redox catalyst system maintains the pH of the mixture within the noted limits. Examples of suitable buffers include sodium carbonate, sodium acetate, disodium phosphate, sodium citrate, sodium benzoate, sodium tartrate, sodium bicarbonate, ammonium hydroxide, and borax (sodium tetraborate decahydrate). In the preferred process of the present invention borax is the buffer. There should be sufficient concentration of borax to obtain the desired pH value in the reacting system. It has been found that a preferred amount of borax is 0.5 to 2.0 parts by weight per 100 parts by weight of the aqueous medium.

The reaction conditions can be varied depending on the extent of polymerization and the final product composition which is desired. In general, the temperatures range from between about 0° C. to about 250° C., preferably from 0° C. to about 150° C., more preferably from about 5° C. to about 60° C., and most preferably from about 5° C. to 50° C.

The pressure is maintained by introducing ethylene. The pressure under which the reaction is conducted is from about 137.8 to 10335.0 kPa (20 to about 1,500 pounds per square inch gauge (psig)), preferably from about 6.9 to 3445 kPa (100 to about 500 psig), and more preferably from about 1033.5 to 2401.5 kPa (150 to 350 psig). Preferably, the temperatures and pressures should be coordinated to maintain the chlorotrifluoroethylene and water in a liquid state.

The time of polymerization depends upon the amount copolymer to be polymerized. The polymerization continues until the desired copolymer is formed. In general polymerization times of from about 10 minutes and about 72 hours may be employed. A preferred polymerization time is between about 5 and 50 hours, more preferably between 5 and 20 hours.

The copolymers produced according to the process of the present invention are thermoplastic polymers containing from 30 to about 65 mol percent, preferably 35 to 65 and more perferably 40 to 60 mol percent ethylene units in the copolymer. The copolymer produced is in the form of an emulsion or latex. The emulsion has from 10 to 50 and preferably 20 to 40 grams of solid per 100 cubic centimeters of latex. The copolymer has a melting point measured by Differential Scanning Calorimetry of between about 120° C. to 265° C., preferably 200° C. and 265° C. The copolymer has a Melt Index as measured by ASTM Test No. 1238 at 275° C. with a load of 2160 grams of greater than 0.1 and preferably from 0.5 to 50 gms/10 min. The copolymer latex is useful as coatings and paints.

There can be from 0 to 10 mol percent but usually 0.1 to 5 mol percent based on the ethylene plus chlorotrifluoroethylene, of other copolymerizable monomers in the copolymers of the present invention. Preferred third monomers include hexafluoroisobutylene, trifluoroethylene, 1,1-difluoroethylene, and perfluoro(alkyl vinyl ether).

Briefly, the copolymerization process of the present invention proceeds in a sealed reactor in several basic steps. An aqueous solution of the fluoro-surfactant is added to the reactor. The oxidizing agent and the buffer are added with the water. These compounds can be added alone followed by water or added with the water. At this time it is preferred to purge and evacuate the atmosphere above the ingredients added in this first step. Optional additives such as molecular weight regulators, antifreeze, anticoagulants, and antifoaming agents can be added in the first step. In the second step, the chlorotrifluoroethylene should be added to the reactor. Ethylene is immediately introduced to bring the reactor to the desired operating pressure. The reducing agent is then added, preferably in a water solution. Preferably an initial amount of reducing agent is added with the balance of the reducing agent continually added as the reaction progresses. The reactor should be maintained at the desired operating pressure by the continuous addition of ethylene. In the final step, the reaction is stopped by venting unreacted monomer from the reactor and the copolymer is collected.

The cupric ion can be added at anytime during the process of the present invention. The cupric ion can be added with oxidizing agents and buffer. However, the cupric cation is preferably added at the same time as the reducing agent, and more preferably with the reducing agent. This affords better control over the whole course of the reaction. When part of the reducing agent is added initially and the balance continually added, a corresponding proportion of the cupric cation is added with the initial amount of reducing agent, and the balance of the cupric cation is added with the balance of the reducing agent. This assures an even and controlled reaction rate.

In the preferred process the charge to the reactor initially contains deionized water, the fluoro-surfactant, the oxidizing agent, and the buffer. The reactor is sealed and preferably purged with an inert gas such as nitrogen. A vacuum is then created. At this time, the antifoaming agent, molecular weight controlling additives and methanol can be added to the reactor. After this the chlorotrifluoroethylene is charged to the reactor, followed by enough ethylene to bring the reactor to the operating pressure. A solution of the reducing agent in water is then pumped into the reactor. As the reaction proceeds, additional amounts of the water solution of the reducing agent can be added, as well as sufficient ethylene to maintain the reactor at the desired operating pressure. The cupric cation is added with the reducing agent. The conditions under which the reaction proceeds are discussed above.

Several examples are set forth below to illustrate the nature of the invention and the manner of carrying it out. However, the invention should not be considered as being limited to the details thereof.

EXAMPLE 1

A 3-gallon glass-lined autoclave, purged with nitrogen and evacuated to remove air, was charged with 8.5 grams of potassium persulfate, 0.08 grams of copper sulfate ($CuSO_4.5H_2O$), 50 grams of borax ($Na_2B_4O_7.10H_2O$), 120 grams of fluorosurfactant, fluorinated alkyl alkoxylate sold by 3M Corp. under the trademark FLUORAD FC-171, and 6000 ml. of deionized water. Agitation at 400 rpm was started and the temperature of the mixture in the reactor was controlled at 20° C. Then 907.2 grams of chlorotrifluoroethylene (CTFE) was charged to the reactor. The reactor was pressurized to 175 psig with ethylene. The polymerization reaction was started by pumping an aqueous solution of sodium metabisulfite continuously at a rate of 200 ml. per hour. The sodium metabisulfite solution was prepared by dissolving 20 grams of sodium metabisulfite in 1000 ml. of deionized water. During the polymerization, a reaction pressure of 175 psig was maintained by feeding ethylene continuously to the reactor. The reaction was terminated after a total time of 4.0 hours, and the reactor was vented and opened to remove the polymer. The latex containing 14.5 grams of dried solid polymer per 100 ml. of emulsion was obtained and there was a total of 1024 grams of polymer, equivalent to over 95% conversion. The polymer had 46.8% by mol of ethylene as measured by carbon-hydrogen elemental analysis and a melting point of 225° C. The reaction rate was satisfactory and a milk-like emulsion formed.

An evaluation of mechanical properties of the polymer is summarized in the following Table:

|  |  | ASTM Test No. |
|---|---|---|
| Yield stress | 4030 psi | D—638 |
| Yield elongation | 3.5% | D—638 |
| Tensile modulus | 202,000 psi | D—638 |
| Ultimate stress | 3450 psi | D—638 |
| Ultimate elongation | 48.5% | D—638 |
| Flexural stress | 7210 psi | D—790 |
| Flexural modulus | 245,000 psi | D—790 |

EXAMPLE 2

The procedure of Example 1 was followed, except that another fluorosurfactant, fluorinated alkyl polyoxyethylene ethanol, trademark FLUORAD ® FC-170C, sold by 3M Corp., was substituted for FLUORAD FC-171. The reaction was terminated after a total of 3 hours, and the recovered latex contained 13.5 grams of solid polymer per 100 ml. of emulsion yielding a total of 920 grams of polymer. The polymer composition was 45.4% by mole ethylene and 54.6% by mole CTFE, and the melting point was 224° C. The reaction rate was satisfactory and a milk-like emulsion formed.

EXAMPLE 3

The procedure of Example 1 was followed, except that another fluorosurfactant, a polyfluoro sulphonic acid, sold by Ugine Kuhlmann under the trademark FORAFAC ® 1033, was substituted for FLUORAD FC-171. The reaction was terminated in 4.0 hours. The recovered latex contained 13.9 grams of solid polymer per 100 ml. of emulsion and a total of 971 grams of polymer. The composition of the polymer made was 43.2% by mol of ethylene and 56.8% by mole of CTFE. The melting point was 231° C. The reaction rate was satisfactory and a milk-like emulsion formed.

EXAMPLE 4

The procedure of Example 1 was repeated without using borax, a buffering agent. The reaction rate was nearly the same as that in Example 1, and was terminated in 4.0 hours. The pH of the reaction mixture tended to decrease during the polymerization and went down to 3.0 from 4.0 at the beginning. The latex recovered contained 15.8 grams of solid polymer per 100 ml. of emulsion and a total of 1147 grams of polymer having 45.2% by mole of ethylene in it and a melting point of 220° C. The reaction rate was satisfactory and a milk-like emulsion formed.

EXAMPLE 5

The procedure of Example 2 was repeated without using borax, a buffering agent. The reaction rate was nearly the same as that in Example 2 and was terminated in 3.0 hours. During the reaction, the pH of the reaction mixture was in between 4.0 and 3.0. The recovered latex containing 13.4 grams of solid polymer per 100 ml of emulsion, and a total of 997 grams of polymer having 45.0% by mol of ethylene and a melting point of 221° C. The reaction rate was satisfactory and a milk-like emulsion formed.

EXAMPLE 6

The procedure of Example 3 was followed using 60 grams of FORAFAC 1033 without using borax. Fifteen ml. of 45% by weight of KOH was added during the reaction in place of the borax. The pH of the reaction mixture in the reactor was 11 immediately after the KOH injection and dropped to 5 at the end of the reaction. The reaction was terminated in 5.0 hours. The recovered latex contained 13.2 grams of solid per 100 ml of emulsion and a total of 1095 grams of polymer having 42.6% by mole of ethylene and a melting point of 230.5° C. The pH of aqueous solution of FORAFAC 1033 is as low as 1.5. It was observed that, at this low pH, the reaction rate was slow. By adding KOH solution, the pH was raised up to 11. As can be seen in the following table, the reaction rate was higher when the pH of the reaction medium was higher than 9.5.

| Reaction time (hrs.) | 0-18.5 | 19.5 | 20.5 | 21.5 | 24.5 |
|---|---|---|---|---|---|
| pH | 1.5 | 9.5 | 11 | 10 | 5 |
| Conversion (%) | 30 | 32 | 39 | 49 | >98 |

The reaction rate was satisfactory and a milk-like emulsion formed.

EXAMPLE 7

The procedure of Example 1 was followed, except that another fluorosurfactant, ethoxylated polyfluoroalcohol sold by Ugine Kuhlmann under the trademark FORAFAC® 1110, was substituted for FLUORAD FC-171. The reaction was terminated in 3.0 hours. The recovered latex contained 9.1 grams of solid per 100 ml. of emulsion and a total of 547 grams of polymer. The composition of the polymer made was 49.3% by mol of ethylene and 50.7% by mol of CTFE. The melting point was 220° C. The reaction rate was satisfactory and a milk-like emulsion formed.

EXAMPLE 8

The procedure of Example 1 was followed, except that another fluorinated surfactant, fluorinated alkyl ester sold by 3M Corp. under the trademark FLUORAD FC-430, was substituted for FLUORAD FC 171. The reaction was terminated in 3.0 hours. The recovered latex contained 13.1 grams of solid per 100 ml. of emulsion and a total of 802 grams of polymer. The composition of polymer was 46.96% by mole of ethylene and 53.04% by mole of CTFE. The melting point of polymer was 221.5° C. The reaction rate was satisfactory and a milk-like emulsion formed.

EXAMPLE 9

The procedure of Example 8 was repeated without using borax as a buffering agent. Instead, 10 ml. of 40% by wt. % of KOH was added to the reactor. The reaction was terminated in about 5 hours. The pH of the reaction mixture in the reactor varied during the reaction from 3.0 (before KOH addition) to 9.5 with the final pH of 6.0. The recovered latex contained 7.9 grams of polymer. The polymer composition was 50.6% and 49.4% by mol of ethylene and CTFE, respectively. The melting point was 220° C. The reaction rate was satisfactory and a milk-like emulsion formed.

EXAMPLE 10

The procedure of Example 1 was followed using FORAFAC 1185, a salt of polyfluoro sulphonic acid sold by Ugine Kuhlmann, instead of FLUORAD FC-171. The amount of chlorotrifluoroethylene (CTFE) was 1814.4 grams. The reaction was terminated in 5 hours and the recovered latex contained 25 grams of polymer per 100 ml of emulsion yielding a total of 1869 grams of polymer. The composition of the polymer made was 47.2% by mol of ethylene and 52.8% by mol of CTFE. The melting point was 220° C. The reaction rate was satisfactory and a milk-like emulsion formed.

EXAMPLE 11

The procedure of Example 10 was followed with 17 ml of chloroform and the reaction was carried out at 50° C. maintaining 225 psig of reaction pressure. The reaction was terminated in 5 hours. The latex recovered contained 17.1 g of polymer in 100 ml of emulsion and a total of 1239 grams of polymer was made. The composition of the polymer was 42.4% by mol of ethylene and 57.6% by mole CTFE and the melting point was 210° C. The reaction rate was satisfactory and a milk-like emulsion formed.

COMPARATIVE 1

A 3-gallon glass-lined autoclave, purged with nitrogen and evacuated to remove air, was charged with 17.0 grams of potassium persulfate, 4 ml of chloroform, 50 grams of borax ($Na_2B_4O_7.10H_2O$), 30. grams of fluorosurfactant, ammonium perfluoroalkyl carboxylate sold by 3M Corp. under the trademark FLUORAD FC-126, and 6000 ml. of deionized water. Agitation at 400 rpm was started and the temperature of the mixture in the reactor was controlled at 20° C. Then 1362 grams of chlorotrifluoroethylene (CTFE) was charged to the reactor. The reactor was pressurized to 175 psig with ethylene. A solution was prepared by dissolving 0.04 grams copper sulfate ($CuSO_4.5H_2O$) and 20 grams of sodium metabisulfite in 2000 ml. of deionized water. The polymerization reaction was started by pumping an aqueous solution containing sodium metabisulfite continuously at a rate of 200 ml. per hour. During the polymerization, a reaction pressure of 175 psig was maintained by feeding ethylene continuously to the reactor. The reaction was terminated after a total time of 3.0 hours, and the reactor was vented and opened to remove the polymer. A latex containing about 3.5 grams of dried solid polymer per 100 ml. of emulsion was obtained and there was a total of 253.2 grams of polymer. The reaction rate was slow. The polymer had 45.4% by mol of ethylene as measured by carbon-hydrogen elemental analysis and the melting point of 220° C.

COMPARATIVE 2

Comparative 1 was repeated using 40 grams of sodium metabisulfite in 2000 grams of water and 90 grams of borax. After 5 hours, the latex contained 3.8 grams of dried solid per 100 ml of latex and a total of 316.5 grams of polymer. The polymer had 46.7 mol percent ethylene. Here again the reaction was slow.

While exemplary embodiments of this invention have been described, the true scope of the invention is to be determined from the following claims:

What is claimed is:

1. A method of copolymerizing ethylene and chlorotrifluoroethylene to form a copolymer having from 30 to 65 mol percent ethylene in an aqueous emulsion comprising the step of copolymerizing ethylene and chlorotrifluoroethylene in the presence of water, a water soluble initiator and from 0.1 to 5.0 percent by weight of water of a water soluble fluorosurfactant having the formula: $CA_3(CF_2)_B(C_2H_4)_D\text{-}X$ wherein A is selected from the group consisting of H and F, B is 1 to 10, D is 1 to 6, and X is a hydrophilic group, wherein to be water soluble at least 0.1 percent by weight of the fluorosurfactant must dissolve in water.

2. The method as recited in claim 1 wherein B is 4 to 10.

3. The method as recited in claim 1 wherein the fluorosurfactant has the formula: $CA_3(CF_2)_B(C_2H_4)_D SO_3E$ wherein A is selected from H and F; E is selected from the group consisting of H+, K+, Na+ and NH4+; B is 6 to 10; and D is 1 to 6.

4. The method as recited in claim 1 further comprising the steps of:
feeding an aqueous solution of the fluorosurfactant to a reactor;
adding chlorotrifluoroethylene to the solution;
feeding gaseous ethylene to the reactor; and feeding the initiator to the reactor.

5. The method as recited in claim 1 wherein X is a radical of a material selected from the group consisting of alkali metal sulfonates, alkali metal carboxylates, ammonium sulfonates, ammonium carboxylate, amine sulfonates, alkyl esters, alkyl alkoxylates, and polyoxyethylene ethanol.

6. The method as recited in claim 1 wherein the fluorosurfactant is selected from the group consisting of fluorinated alkyl alkoxylate, fluorinated alkyl polyoxyethylene ethanol, polyfluorosulfonic acid, alkali metal salt of polyfluorosulfonic acid, ethoxylated polyfluoro alcohol, and fluorinated alkyl ester.

7. The method as recited in claim 1 wherein the initiator is an oxidation-reduction system comprising an oxidizing agent and a reducing agent.

8. The method as recited in claim 4 wherein the initiator is an oxidation-reduction system comprising an oxidizing agent and a reducing agent, wherein the oxidizing agent is added to the aqueous solution of fluorosurfactant and wherein the reducing agent is fed into the reactor after the feeding of the gaseous ethylene.

9. The method as recited in claim 7 further comprising the step of adding 0.1 to 10 parts per million of cupric cation.

10. The method as recited in claim 9 wherein the cupric cation is in the form of cupric sulfate.

11. The method as recited in claim 7 wherein the oxidizing agent is a water soluble alkali metal or alkaline earth metal salt of persulfuric acid or an ammonium salt of persulfuric acid.

12. The method as recited in claim 11 wherein the oxidizing agent is potassium persulfate.

13. The method as recited in claim 7 wherein the reducing agent is selected from the group consisting of ammonium or alkali metal sulfites, thiosulfites, thiosulfates, bisulfites, hydrosulfites, and formaldehyde sulfoxylate.

14. The method as recited in claim 13 wherein the reducing agent is sodium metabisulfite or sodium bisulfite.

15. The method as recited in claim 7 wherein the pH is maintained from above 4 to about 12.

16. The method as recited in claim 1 wherein there is from 0.1 to 5.0 percent based on the weight of the water of the fluorosurfactant.

17. The method as recited in claim 16 wherein there is from 0.25 to 2.0 percent based on the weight of the water of the fluorosurfactant.

18. A method of emulsion copolymerizing ethylene and chlorotrifluoroethylene to form a copolymer having from 30 to 65 mol percent ethylene, which comprises:
adding to a sealed reactor a sufficient amount of water containing from 0.1 to 5.0 percent by weight of water of a fluorosurfactant to support the copolymerization, the fluorosurfactant having the formula: $CA_3(CF_2)_B(C_2H_4)_D\text{-}X$ wherein A is selected from the group consisting of H and F, B is 1 to 10, D is 1 to 6, and X is a hydrophilic group, wherein to be water soluble at least 0.1 percent by weight of the fluorosurfactant must dissolve in water.
adding an oxidizing agent which is a water salt of persulfuric acid and a buffer compound which is capable of maintaining the pH of the reaction above 4 to about 12;
adding chlorotrifluoroethylene to the reactor;
pressurizing said reactor with elhylene to a pressure of from about 137.8 to 10335.0 kPa (20 to about 1500 psig);
adding a water soluble cupric salt and a reducing agent which is selected from the group consisting of an ammonium or alkali metal sulfite, thiosulfite, bisulfite, hydrosulfite, and formaldehyde sulfoxylate to the reactor;
maintaining the temperature of the reactor in the range of from about 0° C. and 250° C.; and
continuing the emulsion copolymerizing until said copolymer has been formed.

19. The method as recited in claim 18 wherein the pressure is from 1033.5 kPa to 2401.5 kPa (150 to 350 psig), and the temperature is from 5° C. to 60° C.

20. The method as recited in claim 18 wherein a cupric cation is added with the reducing agent.

21. The method as recited in claim 18 wherein there is from 0.25 to 2.0 percent based on the weight of the water of the fluorosurfactant.

22. The method as recited in claim 18 wherein the pH of the reaction is maintained from 7 to 10.

23. The method of claim 1 further comprising copolymerizing ethylene, chlorotrifluoroethylene and from 0 to 10 mol percent based on the ethylene and the chlorotrifluoroethylene of other copolymerizable monomers.

* * * * *